Figure 1:
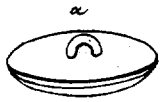
Figure 2:
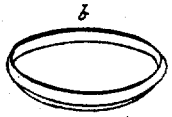
Figure 3:
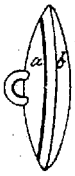

6133X

F. Hayden.

Button

No.

Patented Oct. 1. 1830.

Festus Hayden
Letters Patent X6133

The schedule referred to in these Letters Patent and making part of the same containing a description in the words of the said Festus Hayden himself of his improvement in the manufacture of American wire eyed cast Buttons.

To all to whom these presents shall come. Be it known that I Festus Hayden of Waterbury in the County of New Haven in the State of Connecticut a native citizen of the United States have invented a new & useful improvement in the manufacture of American wire eyed cast Buttons & that the following is a full and exact description thereof. This invention & improvement consists merely in the application of the cap shell rim & inlaid work to the wire eyed cast button in the same manner in all respects except the inlaid work as they have heretofore been applied to buttons made with soldered eyes. The wire eyed cast button for coat or vest or otherwise is made, stamped according to fancy burnished and edged in the usual manner & fitted to receive the cap or shell or rim required which is prepared from the same materials & put on & closed down in the same manner as is usually done on buttons with soldered eyes— The wire eyed cast button may be prepared for inlaid work by an indentation in the face by a suitable stamp or die or by a projection in the face of the mould or by raising the edge by passing two dies calculated for that object, when thus prepared any fancy work of brass or other ornamental metal may be inserted & fixed in its place by the burnisher or by a stamp with ornamental devices impressed upon the raised edge. I do not claim as my invention the method of making the wire eyed cast button, this has long been known & used. I do not claim as any part of my invention

[illegible]

X6133 tion the method of making or preparing the cap, shells, [illegible]
inlaid or other ornamental work attached to the face of other
buttons as now known and used, but I do claim as my inven
tion & improvement: the application thereof to the [illegible]
call button as above described, for this I solicit Letters Pat
ent —. In testimony whereof I hereunto affix my name
and seal this 6th day of Septr A.D. 1830

Witness
Joel Hinman
Frederick Leavenworth

Justus Hayden

Recd.
[illegible]

(Patented October 1. 1830)

[illegible]